United States Patent

Thode

[19]

[11] Patent Number: 5,914,416
[45] Date of Patent: Jun. 22, 1999

[54] DEVICE FOR SEPARATING SOLID OR LIQUID PARTICLES FROM A STREAM OF GAS

[75] Inventor: Jürgen Thode, Wülfrath, Germany

[73] Assignee: Vorwerk & Co. Interholding GmbH, Wuppertal, Germany

[21] Appl. No.: 08/737,058

[22] PCT Filed: Feb. 13, 1995

[86] PCT No.: PCT/EP95/00521

§ 371 Date: Feb. 10, 1997

§ 102(e) Date: Feb. 10, 1997

[87] PCT Pub. No.: WO95/29622

PCT Pub. Date: Nov. 9, 1995

[30] Foreign Application Priority Data

Apr. 29, 1994 [DE] Germany ............................ 44 15 005

[51] Int. Cl.⁶ .................................................. B01D 45/14
[52] U.S. Cl. .................. 55/400; 55/406; 55/408; 55/437; 55/467; 55/DIG. 3; 15/350; 15/353
[58] Field of Search .................... 55/DIG. 3, 437, 55/438, 439, 400, 406, 407, 408, 409, 467, 471; 15/347, 352, 353, 350, 349, 348

[56] References Cited

U.S. PATENT DOCUMENTS

| | | | |
|---|---|---|---|
| 1,133,543 | 3/1915 | Duffie | 55/DIG. 3 |
| 1,420,665 | 6/1922 | Newcombe | 55/DIG. 3 |
| 1,507,271 | 9/1924 | Bennett | 55/408 |
| 1,611,786 | 12/1926 | Serva | 55/DIG. 3 |
| 1,664,092 | 3/1928 | Squires | 55/DIG. 3 |
| 1,759,947 | 5/1930 | Lee . | |
| 2,064,587 | 12/1936 | Carlstedt | 55/DIG. 3 |
| 2,143,144 | 1/1939 | Fagerberg | 55/407 |
| 2,167,786 | 8/1939 | Taylor | 55/408 |
| 2,188,031 | 1/1940 | Brock | 55/403 |
| 2,228,750 | 1/1941 | Brock | 55/403 |
| 2,237,499 | 4/1941 | Osterdahl | 55/DIG. 3 |
| 2,244,102 | 6/1941 | Elder | 55/406 |
| 2,244,165 | 6/1941 | MacFarland et al. | 55/408 |
| 2,909,800 | 10/1959 | Grindle et al. | 55/DIG. 3 |
| 2,945,553 | 7/1960 | Brock | 55/408 |
| 3,174,264 | 3/1965 | McKnab | 55/401 |
| 4,172,710 | 10/1979 | Van Der Molen | 55/DIG. 3 |
| 4,382,804 | 5/1983 | Mellor | 55/DIG. 3 |
| 4,547,206 | 10/1985 | Sovis et al. | 55/DIG. 3 |

FOREIGN PATENT DOCUMENTS

| | | | |
|---|---|---|---|
| 978485 | 11/1975 | Canada . | |
| 413923 | 5/1925 | Germany . | |
| 2153664 | 7/1972 | Germany . | |
| 54-124561 | 9/1979 | Japan | 55/406 |
| 58963 | 2/1947 | Netherlands . | |
| 7613475 | 6/1978 | Netherlands . | |

*Primary Examiner*—Duane S. Smith
*Attorney, Agent, or Firm*—Martin A. Farber

[57] ABSTRACT

In a device for separating solid or liquid particles from a stream of gas, there is an aperture of a suction pipe which is substantially directed towards the axis of an impeller. The suction pipe is surrounded by a dust collecting container. To improve phase separation, especially in a vacuum cleaner in which the dust collecting container is fitted upstream of a dust bag, there is an axial aperture in the impeller and/or a straight aperture from the dust collecting container to the impeller. This generates an air vortex in the region of the opening of the suction pipe which carries the particles outwards where they are further transported into the dust collecting container by a secondary vortex induced therein.

7 Claims, 9 Drawing Sheets

DEVICE FOR SEPARATING SOLID OR LIQUID PARTICLES FROM A STREAM OF GAS

FIELD AND BACKGROUND OF THE INVENTION

The invention relates to a device for separating solid or liquid particles from a stream of gas, in particular a vacuum cleaner.

A device of this kind is known from OS 21 53 664. Which comprises a vacuum cleaner, in which dust-laden air is sucked through a suction tube by a fan. Connected upstream of the fan is an impeller, towards whose axis the opening of the suction tube is directed. Upstream of the impeller, there is located a dust collecting container surrounding the suction tube. By means of a screw-thread shaped channel, the dust collecting container is linked to the impeller.

In the known solution, it has proven that the particle separation from the stream of gas is only incomplete.

SUMMARY OF THE INVENTION

The invention is therefore based on the problem of improving the phase separation in a device of this kind.

As a result of the development, according to the invention, of the known device, there is generated, in the region of the opening of the suction tube, an air vortex which transports the particles outwards. There, the particles are to be further transported into the dust collecting container by a secondary vortex induced in the dust collecting container. It is essential in this connection, that the solid or liquid particles to be separated are transported out of the stream of gas. It may be provided, in this connection, that the impeller is formed by the fan wheel. Because of the straight-line opening of the dust collecting container, extending through in the direction of the impeller, the particles, accelerated by impinging upon the impeller, are seized by the secondary vortex and transported out of the stream of gas, so that the particles may deposit in the dust collecting container. To intensify the development of secondary vortices, the ratio of dust container diameter and impeller diameter should preferably assume values greater than 2. A development of the invention provides that the impeller is located, in the direction of flow, before the fan wheel. By this means, the phase separation takes place before the fan wheel, so that the fan wheel is not impinged upon by particles. In this arrangement, it proves advantageous for the stream of gas to pass in axial direction through the impeller. The particles accelerated tangentially on impinging upon the blade surfaces then move in a substantially stationary vortex about the impeller axis and, as a result of the centrifugal force, reach the edge of a impeller chamber, from which, as a result of the gravitational force or of the induced secondary vortex, they are transported into the dust collecting container. The impeller chamber has, preferably, a funnel-shaped form and ends cone-shaped in the direction of suction. The impeller is preferably two-bladed. The blades may be disposed, according to a preferred development, in the region of the tip of a cone-shaped sieve, the cone widening in the direction of the stream of gas. The rotational speed is to amount to from 10,000 revolutions per minute. By this means, there is provided an effective impulse transfer to the particles from the blades or from the bars of the sieve.

A compact structural shape is achieved when the impeller, the sieve and the fan wheel are joined to one another as a material unit. The cone-shaped sieve has apertures which are interrupted in the circumferential direction by bars. The aperture width and the bar height are, with regard to the rotational speed and to the maximum speed of the gas, matched to one another in such a way that the particles passing through the apertures when the sieve is rotating are always met by the bar and are thus spun out of the sieve. The cone-shaped sieve form is especially suitable for this mechanism. Another development of the invention provides that the suction tube, in the region of the dust collecting container, is surrounded by a funnel-shaped screen. By this means there is minimised the formation of the induced secondary vortex in the region of the base of the dust collecting container.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
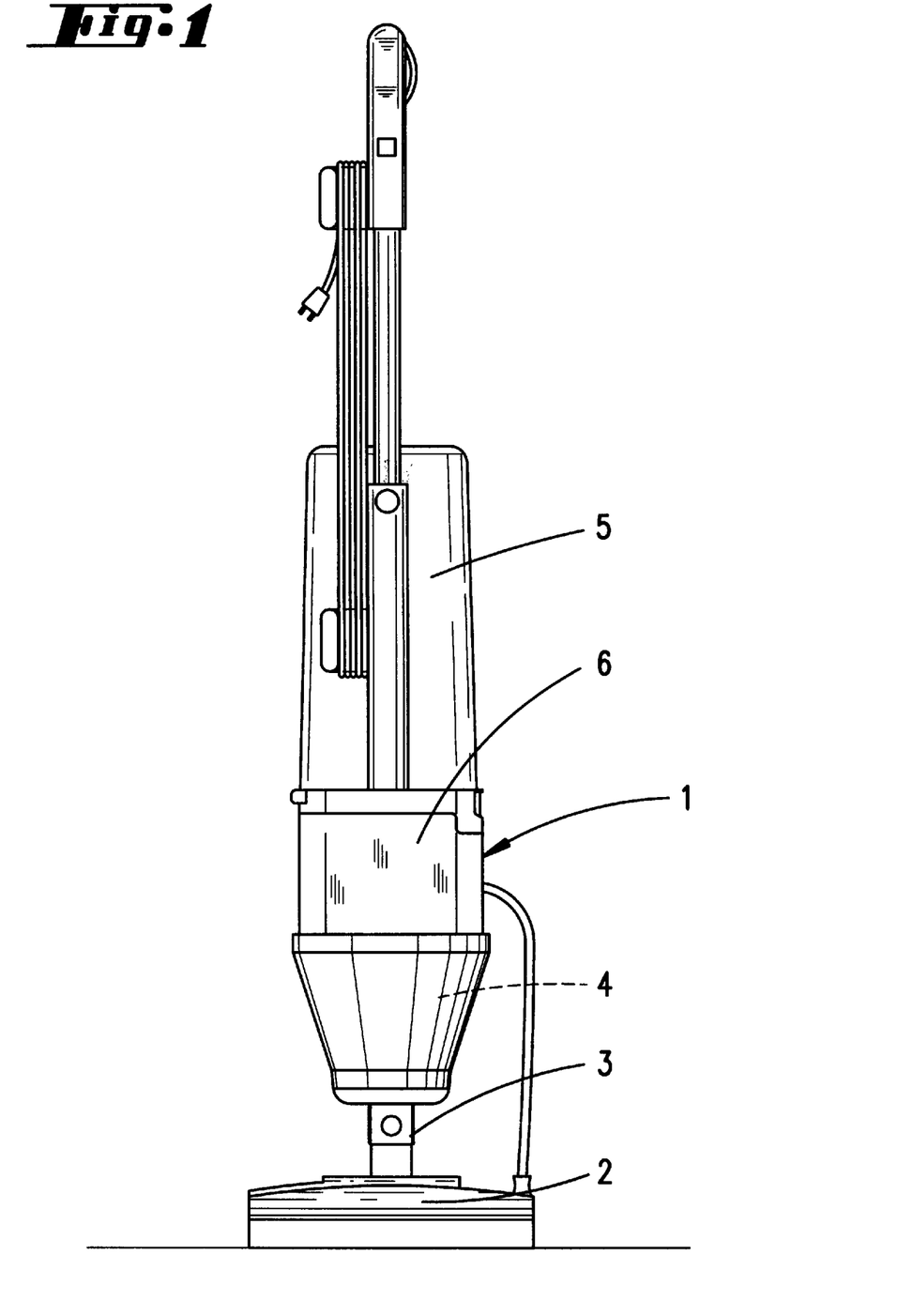
FIG. 1 shows a vacuum cleaner according to the invention.

The device according to the invention, for the separation of phases, i.e. solid or liquid particles from a stream of gas, is preferably used in a vacuum cleaner, as is represented here, for example, in FIG. 1. The vacuum cleaner 1 has a motor housing 6, in which there is provided an electric motor, which operates a fan wheel 8, by which the suction air is sucked through a suction nozzle 2 and a suction tube 3 connected to the nozzle. An impeller 9 provided in the vacuum cleaner 1 is intended, in this connection, to separate the solid or liquid particles from the stream of gas. The air thus precleaned is then transported by the fan wheel 8 into the dust bag now acting as fine filter 5.

The separation of the solid and liquid particles from the stream of gas is effected, preferably, at a rotational speed of 20,000 to 35,000 revolutions per minute. Especially by the use of a cone-shaped sieve 17, the particle size which deposits in the dust collecting container 4 may be reduced to the size of 10 $\mu$m. This has the advantage that the dust bag 5 as good as never needs to be emptied and that the dust bag 5 may be formed to be very small in its dimensions. Moreover, the filter cloth used for the dust bag may be matched to the particle fraction up to the size of 10 $\mu$m, so that use may be made of a high-energy filter system, advantageous with regard to cost. The device is suitable for the separation of solid particles, but also for the sucking up of liquid. The liquid droplets present in the stream of gas are, in the same way as dust particles, accelerated tangentially by the impeller and transported out of the stream of air.

Figure 2:
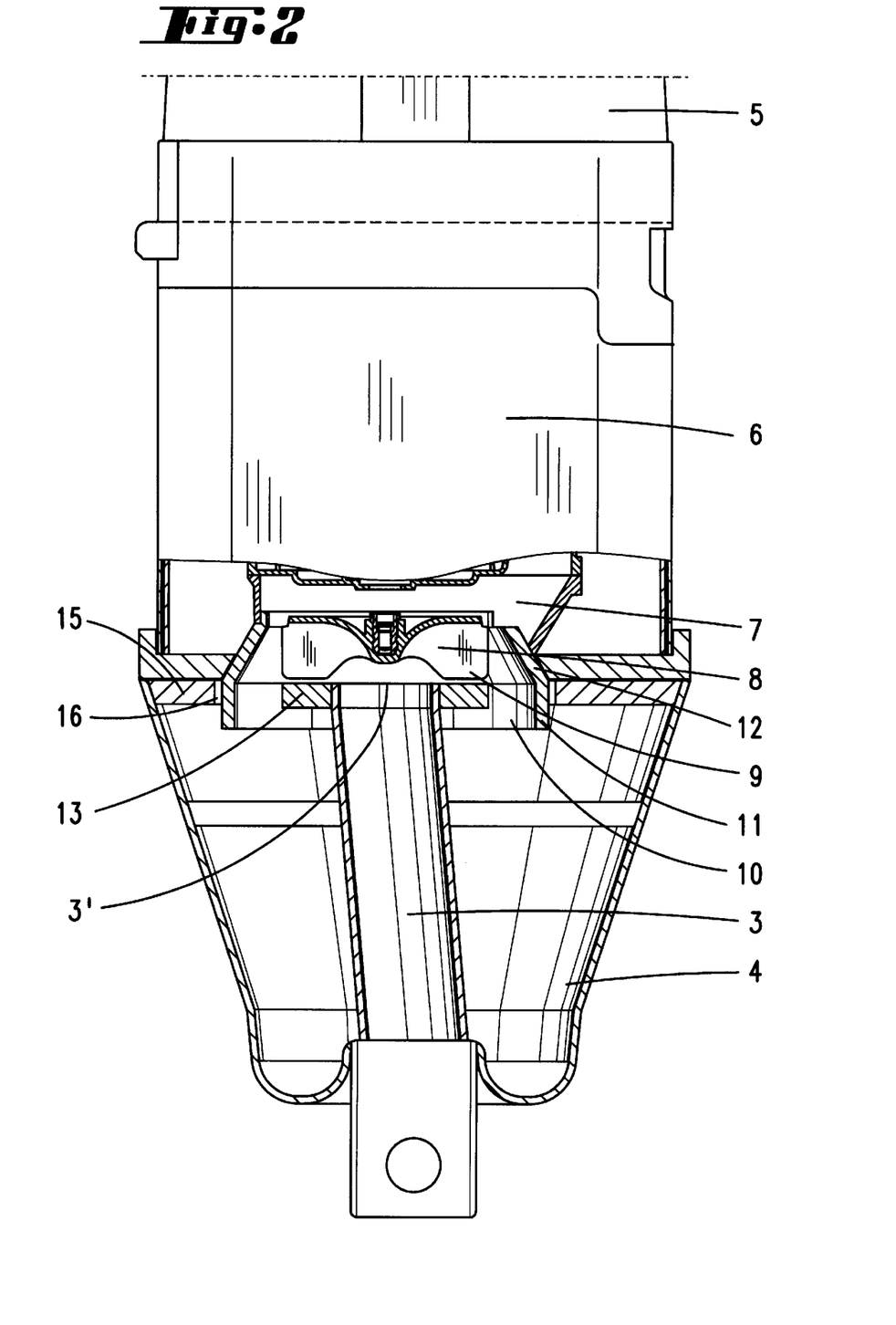
FIG. 2 shows a section through a first embodiment.
Figure 3:
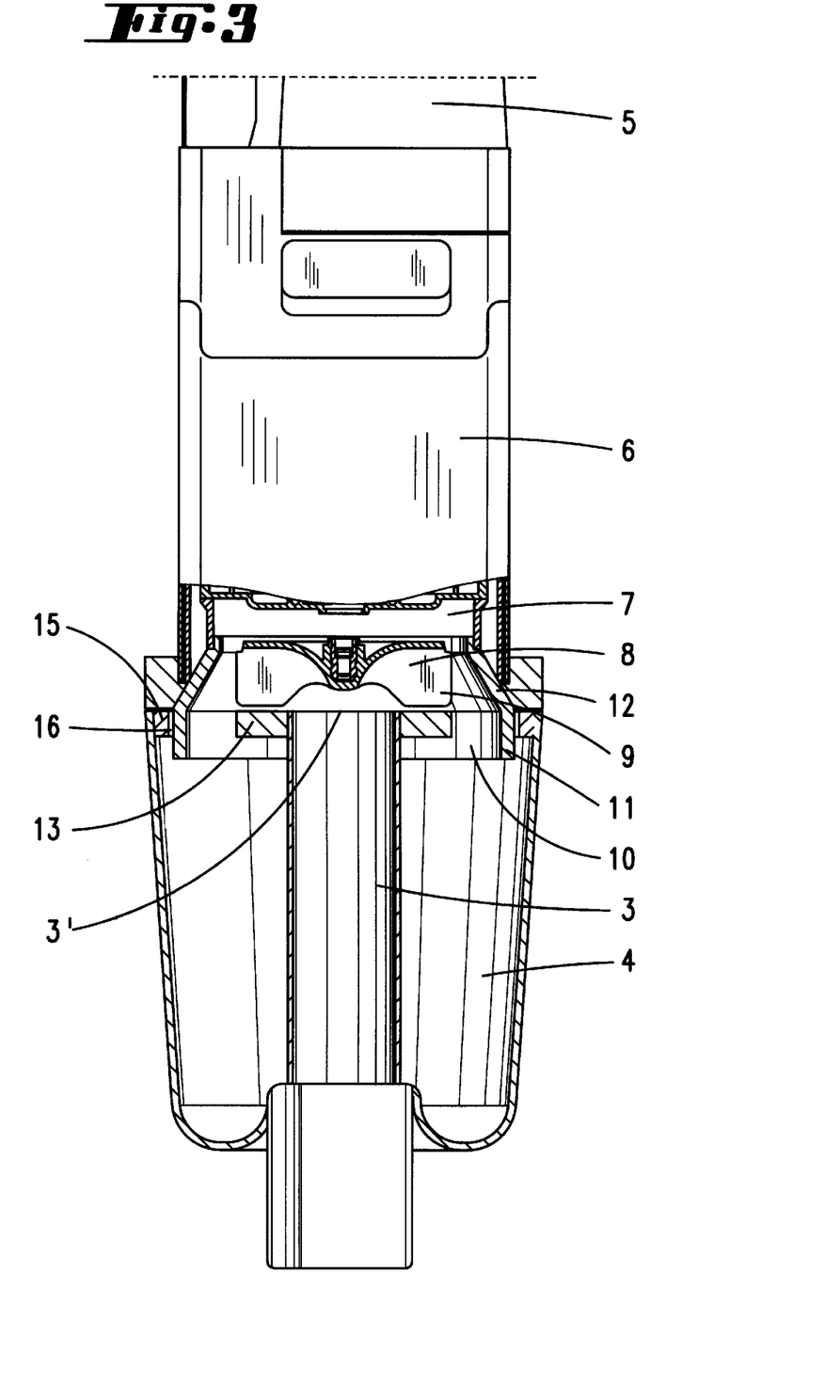
FIG. 3 shows a section according to the first embodiment, turned through 90°.

The first embodiment represented in FIGS. 2 and 3 has a dust collecting container 4, which surrounds the suction tube 3. The opening 3' of the suction tube 3 is directed towards the axis of an impeller 9. In this embodiment, the impeller is formed by the fan wheel 8. The impeller 9 is surrounded, in this connection, by a funnel-shaped sleeve 12, the tip of the funnel pointing, here, in the direction of the stream of gas. On the funnel opening side, a cylindrical sleeve region 11 is connected to the sleeve surface 12. The cylindrical sleeve region 11 overlaps, in this connection, the opening region of the suction tube 3. A screen 13 is disposed around the opening 3' of the suction tube 3, which screen is cylindrical and has the same diameter as the impeller 9. By this means, it is achieved that the impeller sucks in only air out of the suction tube 3.

The dust collecting container 4 is otherwise closed on all sides. Only in the region of its cover 15 is there an opening 16, into which the aforementioned cylindrical cover penetrates. The funnel-shaped sleeve 12 extends approximately over the entire impeller region. At its smaller-diametered side, the sleeve 12 has a circular slit, which opens into an exit air channel 7. The exit air channel 7 conducts the air past the motor into the dust bag 5.

As a result of the rotational movement of the impeller 9 about its axis, the air is accelerated in the radial direction. Because of the otherwise all-sided closure of the dust collecting container 4, the air sucked in by the fan wheel 8 may escape only through the slits on the funnel-opening side, into the exit air channel 7. About the impeller 9, there forms an air vortex which, as a result of the sloping wall of the sleeve 12, extends out into the region of the sleeve 11. In this vortex, the solid or liquid particles separate in the radial direction, that is into the region of the screen 13. As a result of the straight-line opening 10 of the dust collecting container 4 directed towards the impeller 9, there is induced, at least in the upper region of the dust collecting container 4, a secondary vortex, which transports the dust particles into the dust collecting container 4. The screen 13 ensures that the impeller 9 itself does not disturb the induced secondary vortex.

Figure 4:
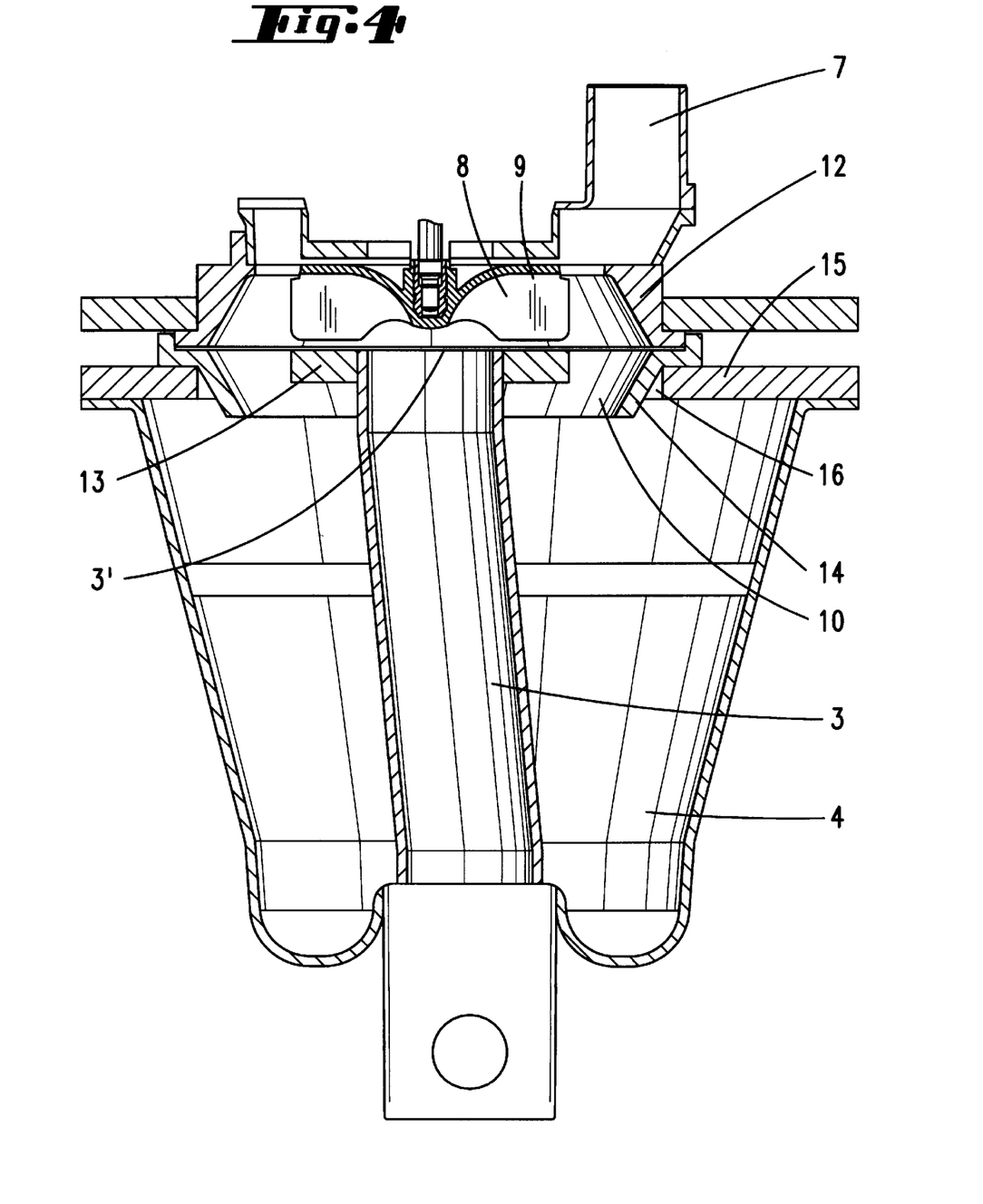
FIG. 4 shows a section through a second embodiment.

The second embodiment represented in FIG. 4 differs from the first embodiment substantially in that the straight-line opening 10 of the dust collecting container 4 is surrounded at the edge by a funnel-shaped sleeve 14. The largest diameter of the sleeve 14 adjoins the largest diameter of the funnel-shaped sleeve 12. Here also the air flows into an exit air channel 7.

In the embodiments three to six, the fan wheel 8 is not the same as the impeller 9. The fan wheel 8 is, on the contrary, located, in the direction of flow, after the impeller 9. The impeller 9 also has such a form that the air flow can pass through the air blades substantially in the axial direction. For this purpose, there are provided sieve-type apertures 23, which are associated with a cone-shaped sieve 17. The vertex angle of the cone should preferably amount to between 40 and 140°, in order to achieve an especially good separating effect. The vertex 17' of the sieve 17 points, in this connection, towards the opening 3' of the suction tube 3. Onto the cone envelope surface, there are moulded two oppositely located blades 24, which form the impeller 9. On the cone envelope surface of the sieve 17, there are provided three rows of apertures 23, which are each separated by bars 27. The width of the apertures 23 is dependent on the radial position of the respective aperture. The width depends also on the effective height of the bar in the direction of the stream of gas. The dimensioning of aperture width and bar height is chosen as a function of the maximum air flow speed through the opening and the rotational speed of the sieve in such a way that the dust particles, on passage through the aperture, are met by the bar 27. By this means, there is guaranteed an optimal separation of the phases. All particles not already met by the blade 24 of the impeller 9 are then, on entry into the sieve, tangentially accelerated, so that they are spun transversely out of the suction flow which extends substantially in the axial direction and then deposit in the dust collecting container 4. The radius of the blade 24 is, in this connection, at least as great as, preferably slightly greater than, the radius of the circular opening 3' of the suction tube 3. In the same way, the greatest diameter of the sieve 17 is somewhat larger than the opening 3'.

Figure 7:
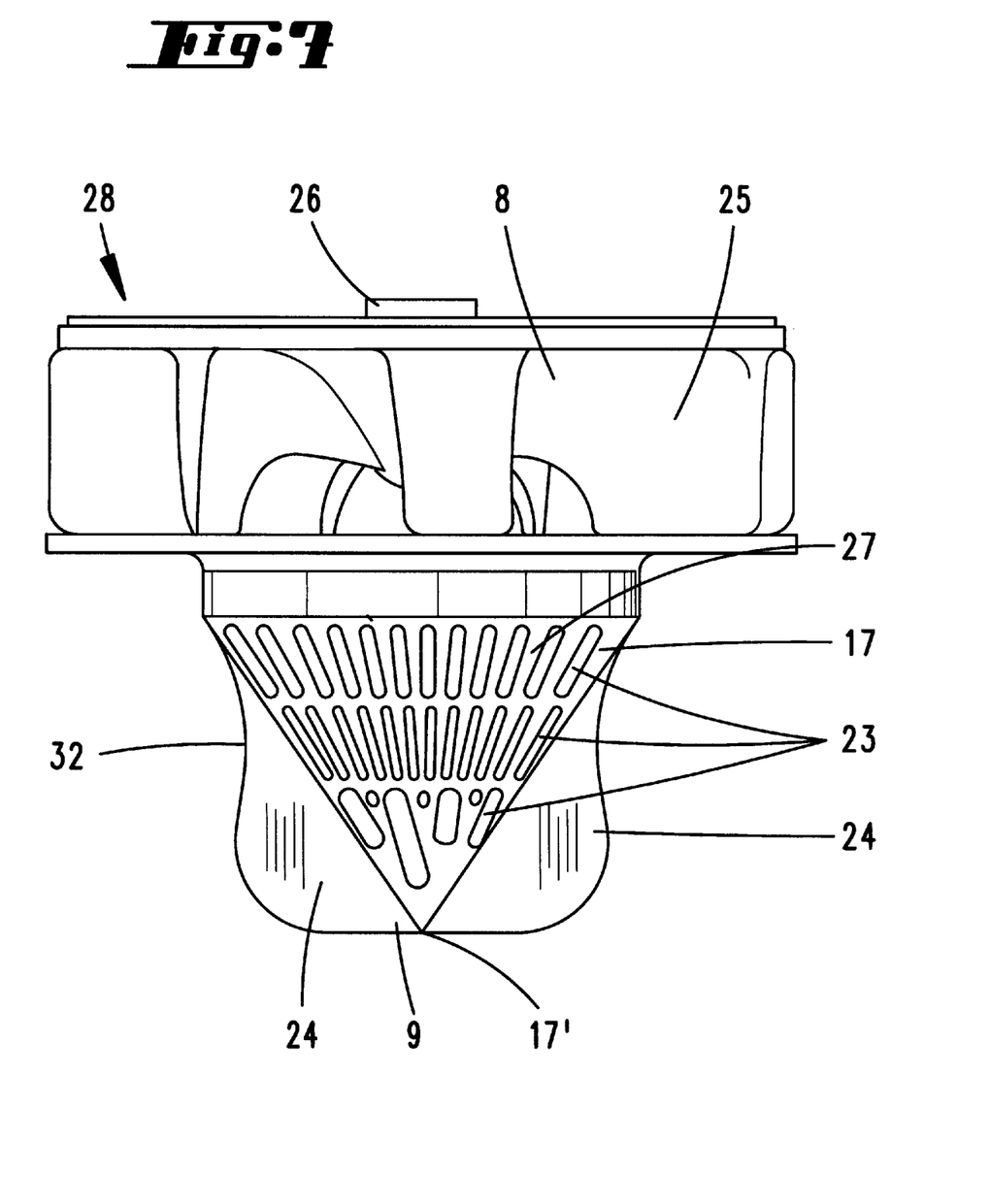
FIG. 7 shows a sieve-blade fan wheel according to embodiments three, four and five.
Figure 8:
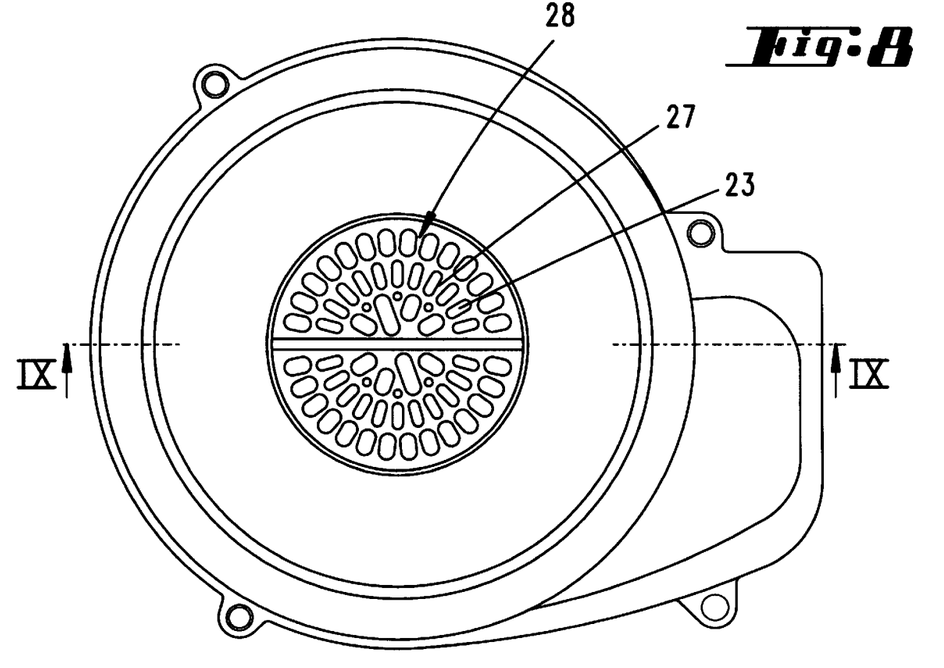
FIG. 8 shows the plan view onto the impeller of a fifth embodiment.
Figure 9:
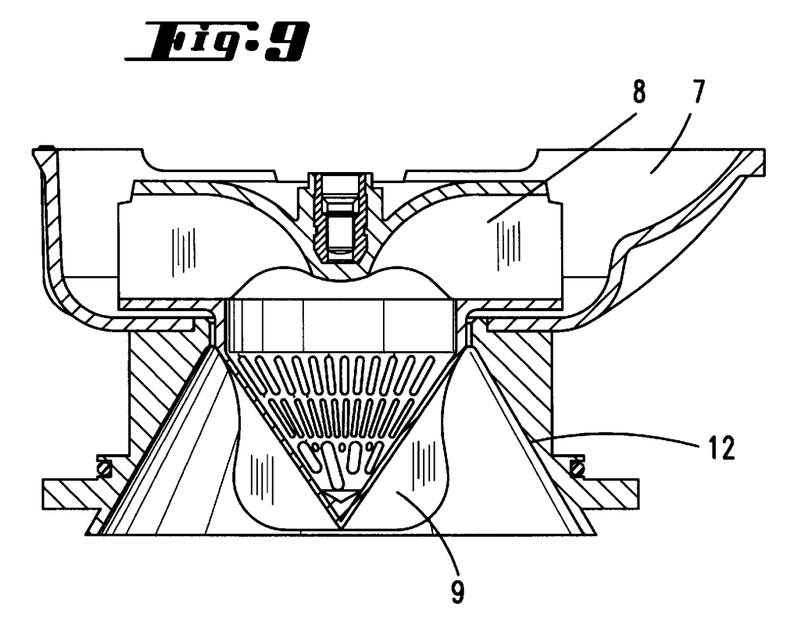
FIG. 9 shows a section through a sieve-blade fan wheel according to the fifth embodiment, corresponding to the line IX—IX.

As is to be noted in particular from FIG. 7, the impeller 9 forms, together with the sieve 17 and the fan wheel 8, a single material unit, namely the sieve-blade fan-wheel 28. This sieve-blade fan-wheel 28 has a drive coupling 26 for the shaft of the electric motor. It also has a multiplicity of fan blades 25.

In the embodiment according to FIGS. 5 to 10, there may be seen a cylindrical portion 18 in the intermediate region between the downstream-located fan wheel 8 and the conical sieve 17 of the sieve-blade fan-wheel 28, which cylindrical portion 18 is encompassed by the smallest-diametered region of the dust collecting container opening 10 which terminates in a funnel-shape. The wall is formed by the sleeve 12. By this arrangement, it is assured that all the air is sucked through the conical sieve 17 by the fan wheel 8. This means that, as a result of the impinging, effected in the circumferential direction, either of the bars 27 or of the blades 24 on the dust particles, these dust particles are transported transversely out of the stream of gas into a surrounding gas vortex, from which they fall into the dust collecting container 4.

Figure 6:
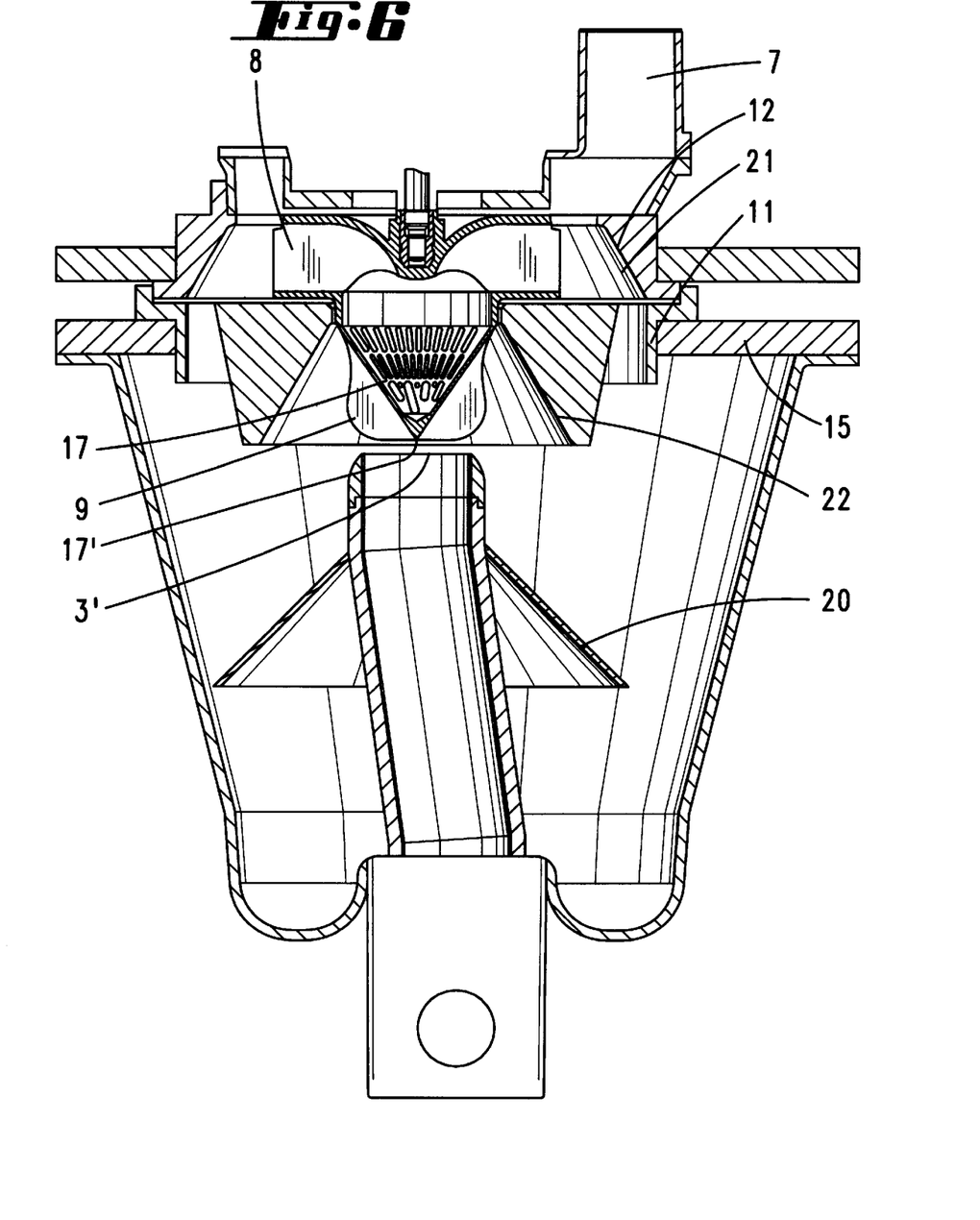
FIG. 6 shows a section through a fourth embodiment.

In the embodiment according to FIG. 6, it is to be seen that a frustoconically shaped sleeve 22, which surrounds the conical sieve 17, penetrates into the dust collecting container 4, through the opening of the cover 15 of the dust collecting container 4. An additional, cylindrical-shaped sleeve 11 surrounding the sleeve 22 is connected, by means of an auxiliary air channel 21, to the fan chamber, which has a funnel-shaped wall 12. Between the opening plane of the opening of the sleeve 22 and the suction-tube opening 3', there is a small space. The tip 17' of the sieve 17 lies in the opening plane of the sleeve 22, and is thus spaced apart by the same amount from the suction opening 3'.

In the sieve-blade fan-wheel 28 (see FIG. 7), there are provided two oppositely disposed blades 24, whose lower edges run into the tip 17' of the conical sieve 17. The corners of the blades 24 are rounded and the blades have an arc-shaped reduction in area 32. The vanes 24 merge smoothly into the largest-diametered base of the sieve. The blades 24 extend from these substantially parallel to the cone envelope surface of the sieve 17. By this means, it is guaranteed that the apertures 23 and the bars 27 lie at the same height as the blades 24.

Figure 5:
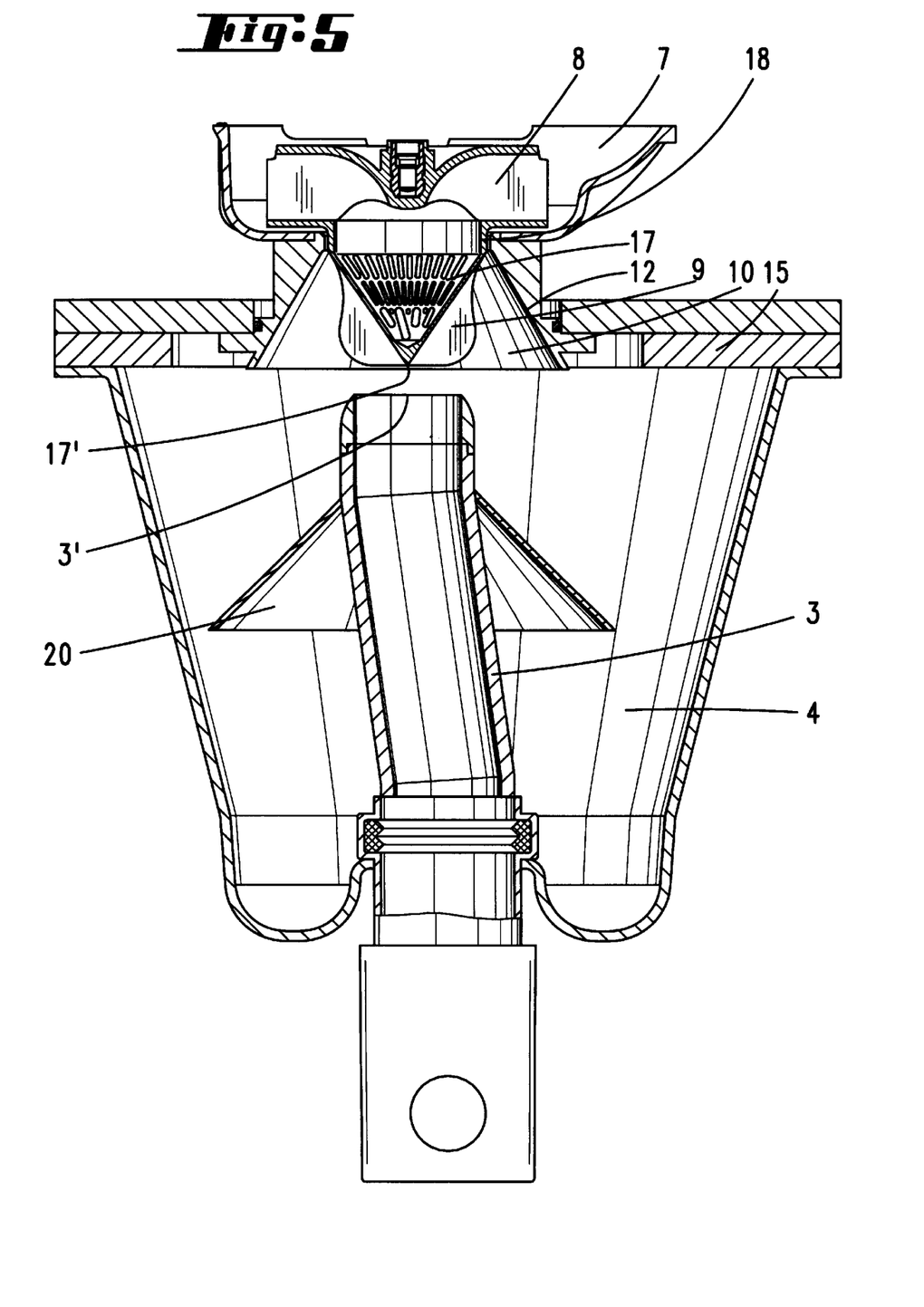
FIG. 5 shows a section through a third embodiment.

In the embodiments according to FIG. 5 and FIG. 6, there is further provided a funnel-shaped screen 20, which surrounds the suction tube 3. The largest-diametered region of the screen 20 points, in this connection, in the direction of the base of the dust collecting container 4.

In a vacuum cleaner of this type, air impinges axially upon a centrifugal wheel, by which the air is guided radially outwards, so that the larger dust particles are spun against the inner side of a guiding surface surrounding the centrifugal wheel. After that, the air, now laden only with fine dust particles, is diverted radially inwards into a drum located behind the centrifugal wheel, which drum is smaller in diameter, co-rotating, cylindrical, and provided with apertures. In that the drum is provided with a relatively large number of apertures, which form small blades, even the fine dust particles may be spun, by the better transmission of the rotational movement to the air, outwards against the inner side of a guiding surface surrounding the cylindrical drum. After flowing through the drum, the air is diverted again in the axial direction and blown out by the motor into the environment. Dust which reaches downstream-located filter bags may, in this connection, with increasing filling of the filter, reduce the suction capacity of the device. In order to realize a phase separation within the smallest possible structural space, with the shortest possible flow path, as far as possible without change in the direction of the flow and with better flow efficiency, it is provided, according to the invention, that there is provided, in a vacuum cleaner, a dust collecting container, a space for a blower unit 8 and a space for the air exit 7. The suction tube 3 is in connection, on the one side, with a cleaning nozzle 2 and, on the other side, with the dust collecting container 4. The dirt-laden air is guided, in this connection, by the suction tube 3 in such a way that it impinges centrally on a separating unit 28 (the impeller 9), which is located in a separating space. The separating unit 28 comprises a cone-shaped hollow body, which is provided with the apertures 23 which are aligned in the direction of flow of the air. On the cone-shaped hollow body 17, there are mounted a number of straight, radial blades 24. The separating unit is either fixedly mounted on the fan wheel 8, which is driven by a motor shaft 26, or is connected to the fan wheel by a further suction tube (FIG. 10) 31 and is then driven by a separate motor M2. Dirt particles which are separated by the separating unit 28 are diverted by the inner wall surface 12 of the separating space, which is in connection with the dust collecting container 4, into this dust collecting container 4. The air thus cleaned then flows onwards to the fan wheel 8, and from there into the air exit 7.

By the arrangement according to the invention, it is achieved that the dirt-laden air impinges, through the suction tube 3, axially upon the separating unit 9, 17, through which it then also axially emerges, while the coarse dirt is spun, by the straight blades 24 and the fine dirt by the small blade wheel formed by the apertures 23 in the cone-shaped hollow body 17, radially outwards against the inner side of the separating space. There is achieved, by these many small apertures 23, a better transfer of the rotational movement to the dirt-laden air than with the straight blades and even very small proportions may thereby be separated from the air.

Separated dirt particles are conducted by the correspondingly formed inner side of the separating space into the dust collecting container 4. This air freed of dirt then flows onwards axially into the blower unit 8. Dirt-laden air can also be understood to mean a water-air mixture, the water droplets being then separated correspondingly from the air.

Figure 10:
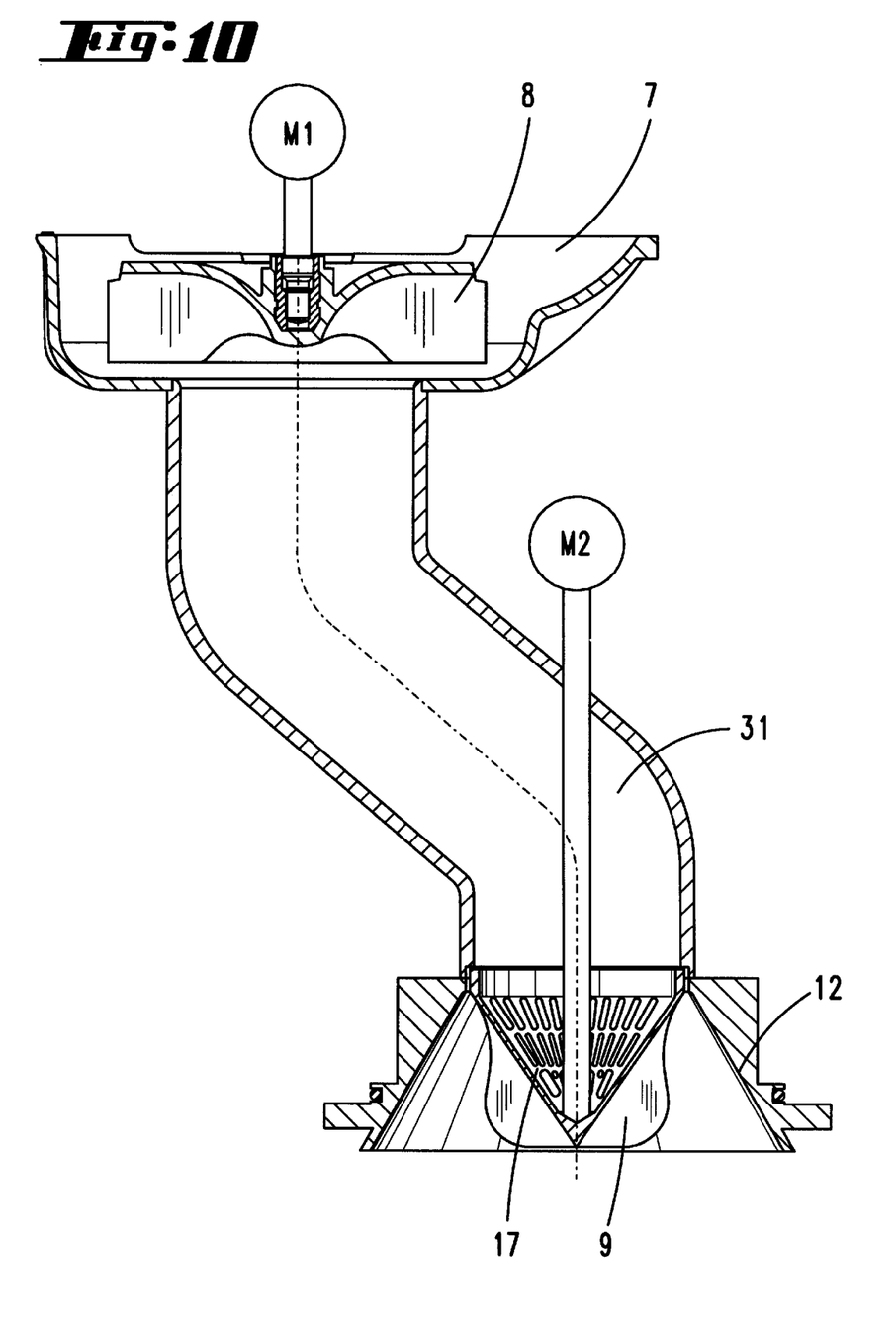
FIG. 10 shows a sixth embodiment of the invention.

In the embodiment represented in FIG. 10, there is shown, as well as the motor M2, which drives the separating unit 9, 17, an additional motor M1, which operates the fan wheel 8. The fan wheel 8 and the separating unit 9, 17 are connected to one another by a flow channel 31.

I claim:

1. A device for the separation of solid or liquid particles from a stream of gas, comprising a rotatable fan wheel and an impeller rotatable in conjunction with rotation of the fan wheel, the impeller being located upstream of the fan wheel in the direction of flow and being configured for urging the particles in a direction transverse to the stream of gas prior to passage of the gas through the fan wheel, wherein the device further comprises a conical screen which adjoins the impeller in the direction of flow of the stream of gas, and a particle receiving region encircling the impeller for receiving particles deflected from the gas stream by the impeller.

2. The device according to claim 1, wherein the impeller comprises said conical screen and a plurality of vanes protruding radially from said conical surface.

3. A device according to claim 1, further comprising an element encircling said impeller for forming a space between the conical screen and the encircling element, the space terminating in the shape of a funnel in the direction of flow of the gas stream, said encircling element having a conical surface positioned for deflecting the particles into said particle receiving region.

4. A device according to claim 1, wherein the impeller is a two-bladed impeller.

5. A device according to claim 1, wherein the impeller, the screen, and the fan wheel are joined to one another as a unitary structure.

6. A device according to claim 1, wherein the screen comprises bars defining apertures, and the apertures of the screen in the circumferential direction and the height of the bars of the screen interrupting the aperture are matched to one another in such a way that particles entering into the apertures upon rotation of the apertures at maximum suction speed are impinged upon by the bars during their passage through the apertures.

7. A device according to claim 1, further comprising a suction tube guiding the stream toward the impeller, and a substantially funnel-shaped screen disposed upstream of the impeller, and projecting from the suction tube into a dust collecting container of the device.

* * * * *